US011694679B2

(12) United States Patent
Yavagal et al.

(10) Patent No.: US 11,694,679 B2
(45) Date of Patent: *Jul. 4, 2023

(54) WAKEWORD DETECTION

(71) Applicant: Amazon Technologies, Inc., Seattle, WA (US)

(72) Inventors: Deepak Yavagal, Issaquah, WA (US); Ajith Prabhakara, Seattle, WA (US); John Gray, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/493,188

(22) Filed: Oct. 4, 2021

(65) Prior Publication Data

US 2022/0059084 A1    Feb. 24, 2022

Related U.S. Application Data

(63) Continuation of application No. 16/778,057, filed on Jan. 31, 2020, now Pat. No. 11,151,988, which is a continuation of application No. 16/017,160, filed on Jun. 25, 2018, now Pat. No. 10,762,896.

(51) Int. Cl.
*G10L 15/183* (2013.01)
*G10L 15/06* (2013.01)
*G10L 15/22* (2006.01)
*G10L 15/08* (2006.01)

(52) U.S. Cl.
CPC .......... *G10L 15/183* (2013.01); *G10L 15/063* (2013.01); *G10L 15/22* (2013.01); *G10L 2015/088* (2013.01)

(58) Field of Classification Search
CPC ..... G10L 15/183; G10L 15/063; G10L 15/22; G10L 2015/088
USPC ........................................................ 704/251
See application file for complete search history.

(56) References Cited

U.S. PATENT DOCUMENTS

| | | | |
|---|---|---|---|
| 8,924,219 B1 | 12/2014 | Bringert et al. | |
| 9,275,637 B1 | 3/2016 | Salvador et al. | |
| 9,875,081 B2 | 1/2018 | Meyers et al. | |
| 9,959,861 B2 | 5/2018 | Zhou et al. | |
| 10,074,369 B2 | 9/2018 | Devaraj et al. | |
| 10,074,371 B1 | 9/2018 | Wang et al. | |
| 10,079,015 B1* | 9/2018 | Lockhart | G10L 15/26 |
| 10,102,850 B1 | 10/2018 | Basye et al. | |
| 10,109,294 B1 | 10/2018 | Ayrapetian et al. | |
| 10,170,110 B2 | 1/2019 | Zhou et al. | |

(Continued)

OTHER PUBLICATIONS

Siri Team, "Hey Siri: An On-device DNN-powered Voice Trigger for Apple's Personal Assistant," Apple Machine Learning Journal, vol. 1, Issue 6, Oct. 2017.

(Continued)

*Primary Examiner* — Susan I McFadden
(74) *Attorney, Agent, or Firm* — Pierce Atwood LLP

(57) ABSTRACT

Techniques for processing incoming audio using multiple wakeword detectors are described. Audio data representing an utterance may be processed by different wakeword detectors that can detect different wakewords and are associated with different speech processing components. When a wakeword is detected by one of the wakeword detectors, it may be processed by the corresponding speech processing component.

20 Claims, 14 Drawing Sheets

(56) References Cited

U.S. PATENT DOCUMENTS

| | | | |
|---|---|---|---|
| 10,186,265 B1* | 1/2019 | Lockhart | G10L 15/32 |
| 10,304,425 B1 | 5/2019 | Rose | |
| 10,304,475 B1 | 5/2019 | Wang et al. | |
| 10,366,699 B1 | 7/2019 | Dharia et al. | |
| 10,373,612 B2 | 8/2019 | Parthasarathi et al. | |
| 10,388,276 B2 | 8/2019 | Sun et al. | |
| 10,453,449 B2 | 10/2019 | Devaraj et al. | |
| 10,477,294 B1 | 11/2019 | Jorgovanovic et al. | |
| 10,504,511 B2 | 12/2019 | Wang et al. | |
| 10,510,340 B1 | 12/2019 | Fu et al. | |
| 10,515,623 B1 | 12/2019 | Grizzel | |
| 10,515,625 B1 | 12/2019 | Metallinou et al. | |
| 10,566,012 B1 | 2/2020 | Basye et al. | |
| 10,762,895 B2 | 9/2020 | Togwe et al. | |
| 10,762,896 B1* | 9/2020 | Yavagal | G10L 15/22 |
| 10,777,189 B1* | 9/2020 | Fu | G10L 15/22 |
| 10,825,451 B1* | 11/2020 | Yavagal | G10L 15/183 |
| 11,151,988 B1* | 10/2021 | Yavagal | G10L 17/00 |
| 11,355,112 B1* | 6/2022 | Pahwa | G06N 7/01 |
| 11,373,644 B2* | 6/2022 | Yavagal | G10L 15/22 |
| 11,514,900 B1* | 11/2022 | Yavagal | G10L 15/063 |
| 2016/0189706 A1 | 6/2016 | Zopf et al. | |
| 2018/0096678 A1 | 4/2018 | Zhou et al. | |
| 2018/0108351 A1 | 4/2018 | Beckhardt et al. | |
| 2018/0137857 A1 | 5/2018 | Zhou et al. | |
| 2018/0336886 A1 | 11/2018 | Sun et al. | |
| 2019/0073999 A1 | 3/2019 | Premont et al. | |
| 2019/0251960 A1 | 8/2019 | Maker et al. | |

OTHER PUBLICATIONS

Siri Team, "Personalized Hey Siri," Apple Machine Learning Journal, vol. 1, Issue 9, Apr. 2018.
U.S. Appl. No. 16/017,160, filed Jun. 25, 2018.
U.S. Appl. No. 16/778,057, filed Jan. 31, 2020.
U.S. Appl. No. 16/934,705, filed Jul. 21, 2020.
U.S. Appl. No. 16/017,062, filed Jun. 25, 2018.
U.S. Appl. No. 16/777,257, filed Jan. 30, 2020.
U.S. Appl. No. 16/778,374, filed Jan. 31, 2020.
U.S. Appl. No. 16/783,826, filed Feb. 6, 2020.
U.S. Office Action dated Feb. 4, 2020 for U.S. Appl. No. 16/017,062.

* cited by examiner

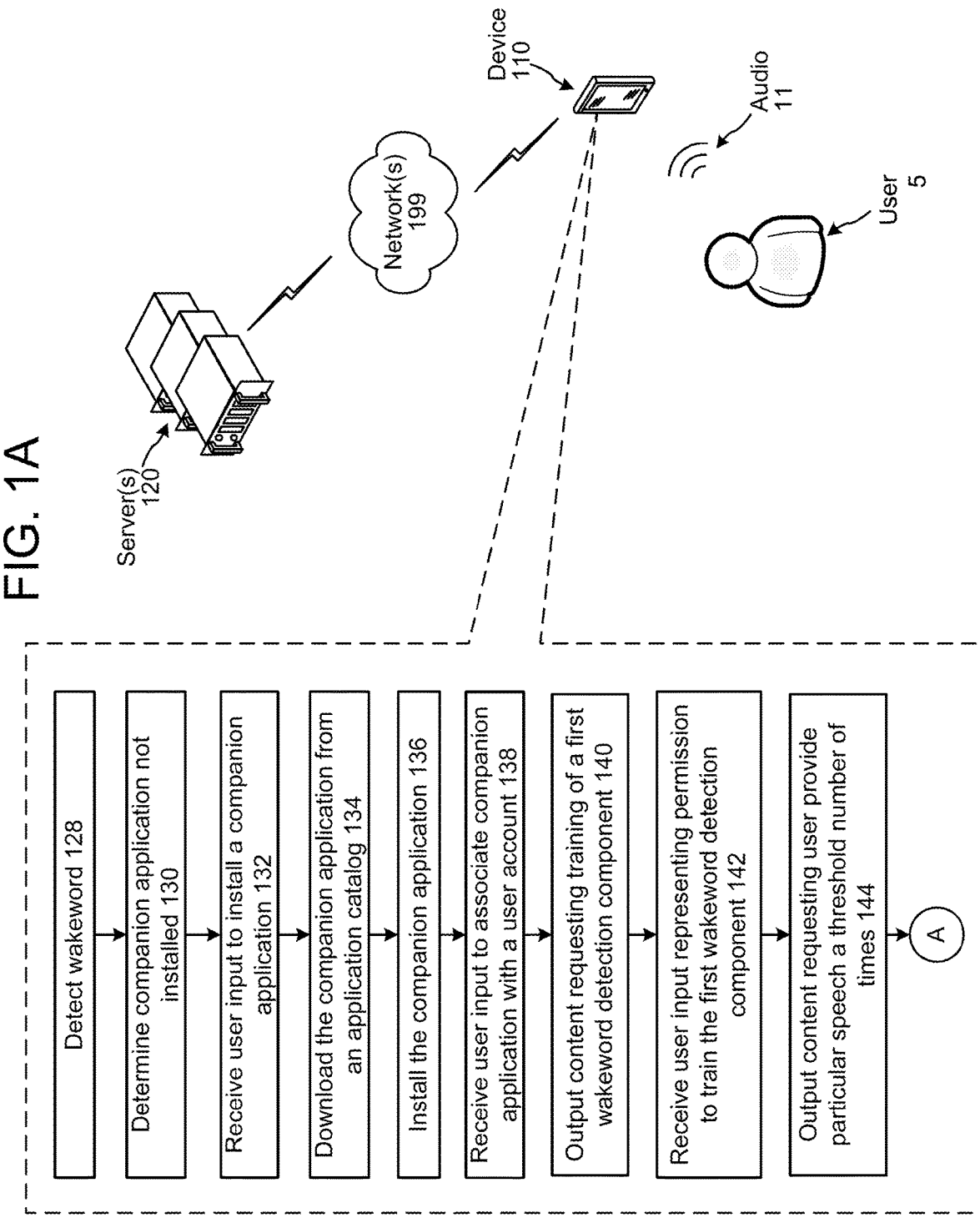

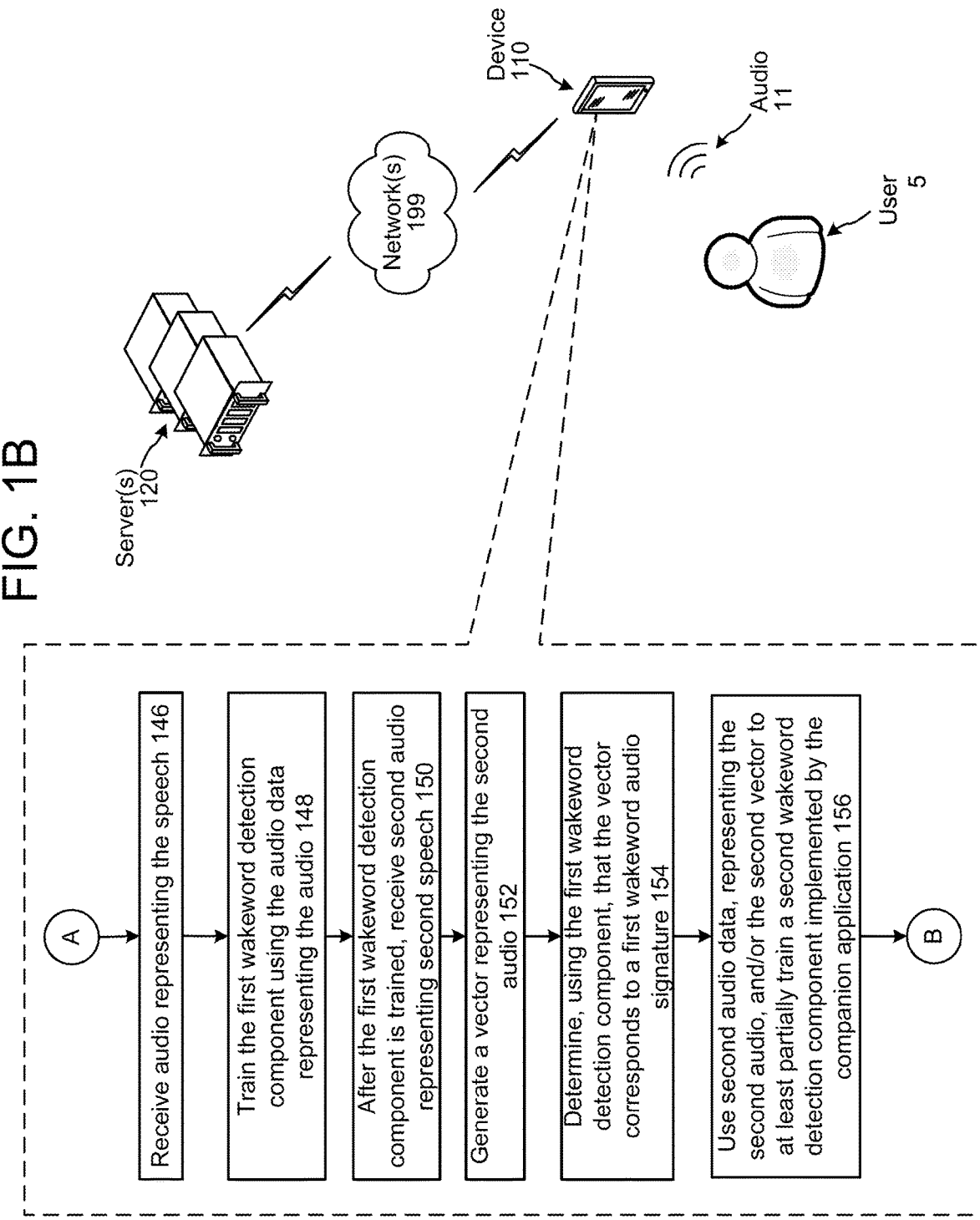

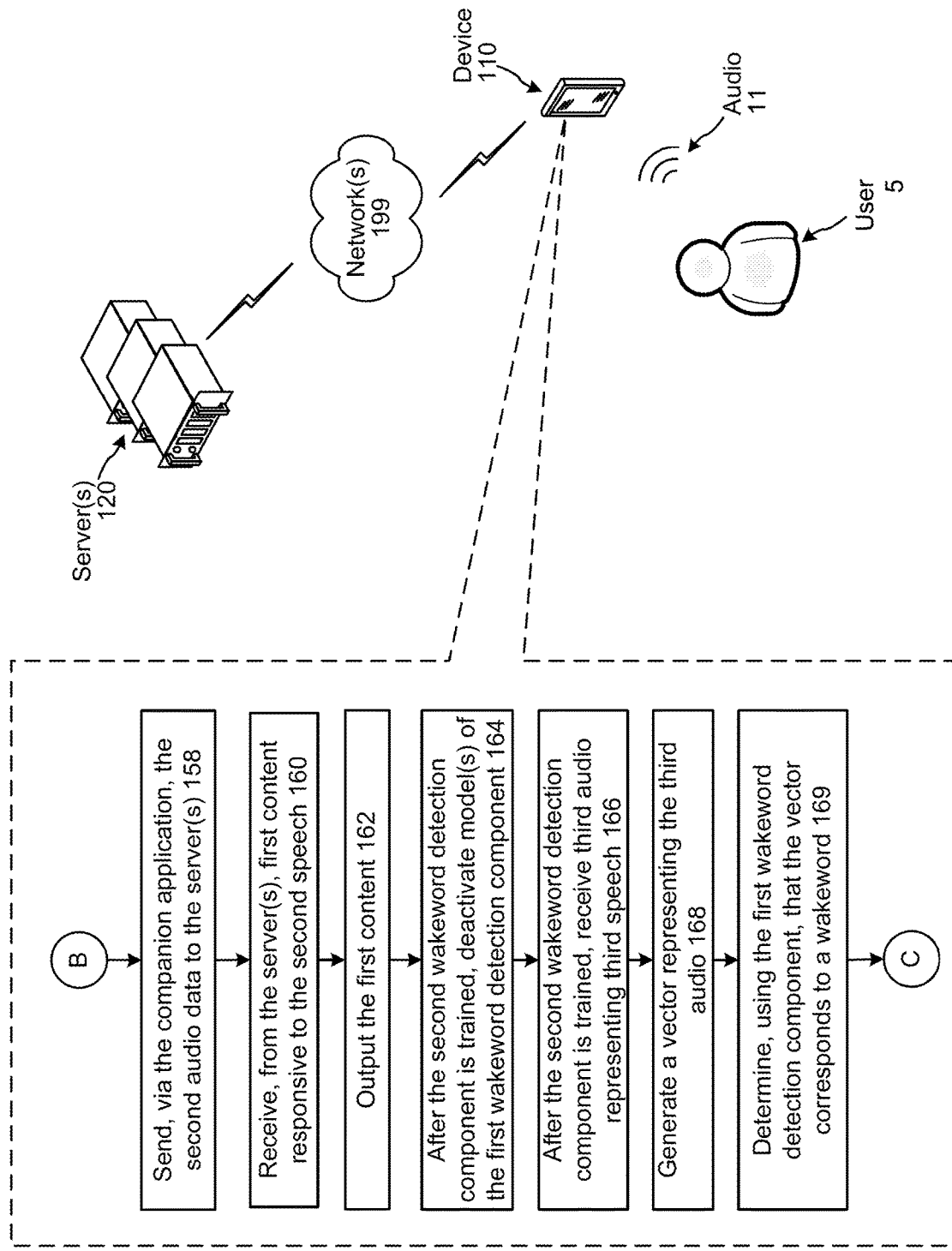

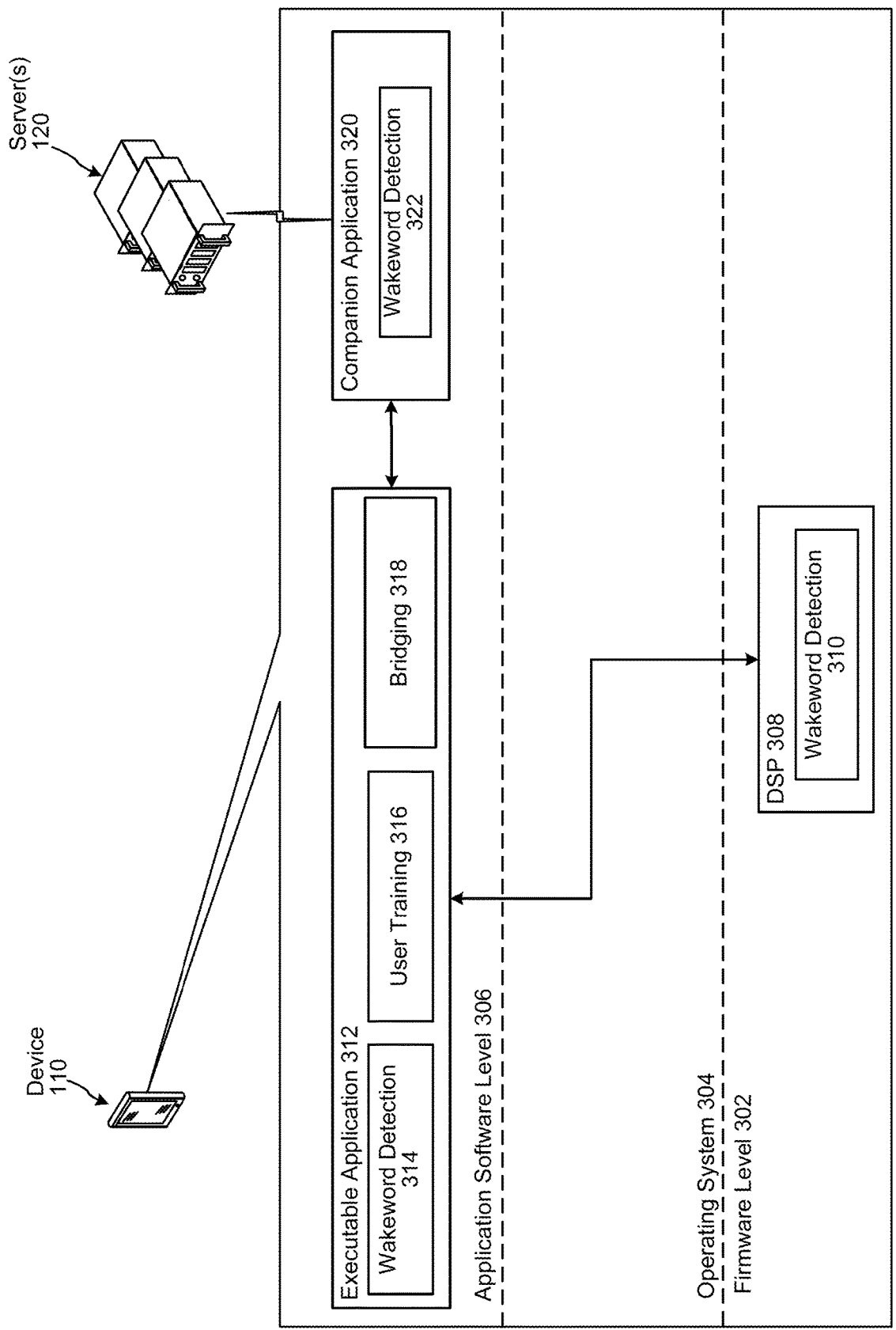

WAKEWORD DETECTION

CROSS-REFERENCE TO RELATED APPLICATION DATA

This application is a continuation of U.S. patent application Ser. No. 16/778,057, entitled "WAKEWORD DETECTION," filed on Jan. 31, 2020 and scheduled to issue as U.S. Pat. No. 11,151,988, which is a continuation of U.S. patent application Ser. No. 16/017,160, entitled "WAKEWORD DETECTION," filed on Jun. 25, 2018, now issued U.S. Pat. No. 10,762,896. The contents of the above applications are expressly incorporated herein by reference in their entireties.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A through 1D illustrate a system configured to detect user inputs using different wakeword detection components according to embodiments of the present disclosure.

FIG. 3 is a conceptual diagram of wakeword detection components of a device according to embodiments of the present disclosure

DETAILED DESCRIPTION

Figure 1D:
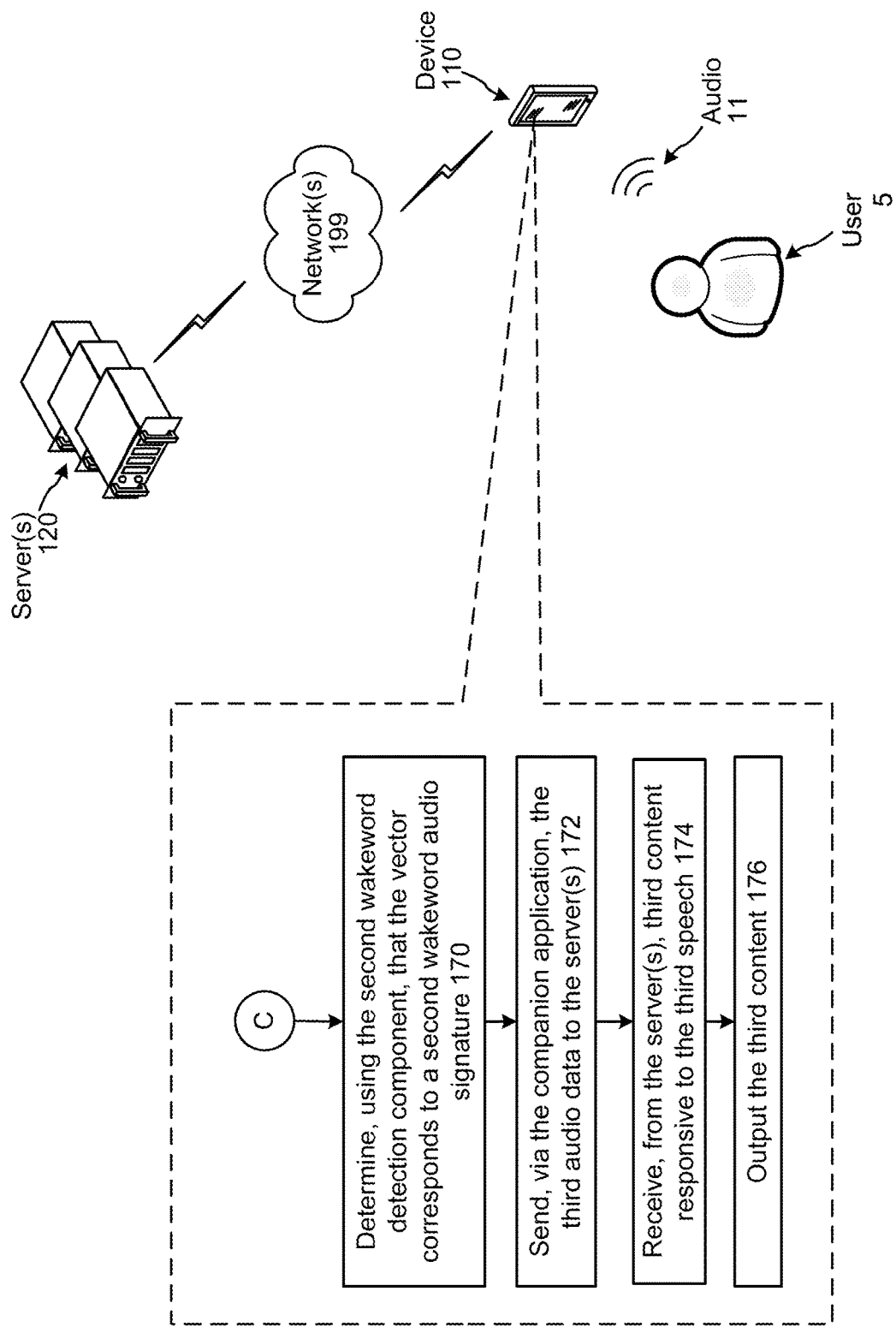

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may be configured to perform actions responsive to user inputs. For example, a system may be configured to output weather information in response to a user input corresponding to "Alexa, what is the weather." For further example, a system may be configured to output music performed by Adele in response to a user input corresponding to "Alexa, play Adele music."

A device may be configured to receive a spoken user input, detect a wakeword (such as a keyword) in the user input, and perform an action in response to detecting the wakeword. For example, in response to the device detecting the wakeword, the device may send audio data, representing the user input, to a server(s) for processing (e.g., speech processing and command processing).

Certain devices may be configured with one or more wakeword detectors that need to be trained with respect to a particular user of the device. The user may be requested to speak one or more particular utterances, words, or the like to the device. The device uses the requested speech to train the wakeword detector(s).

The present disclosure improves present devices by implementing multiple wakeword detectors on a single device and selectively using the wakeword detectors at different times. Such results in greater accuracy of wakeword detection and provides greater control over battery usage of the device.

When a device is manufactured, the device may include a digital signal processor (DSP) configured with an untrained wakeword detector. At some point in time, the user may download a companion application to the device.

A companion application enables a device, not previously in communication with a server(s), to communicate with the server(s) via the companion application. An example companion application is the Amazon Alexa application that may be installed on various smart phones, tablets, etc.

After the companion application is downloaded, the wakeword detector of the DSP may be trained using the user's speech. The user may be requested to speak particular utterances to the device and the device may use the utterances to train the wakeword detector of the DSP. The trained wakeword detector may be wholly implemented by the DSP or may be distributed across the DSP and a software level of the device.

At some point in time, the companion application may be configured to implement its own wakeword detector. The companion application's wakeword detector may be pushed to the device in the form of a software update. The companion application's wakeword detector may need to be trained with respect to the user of the device prior to it being used at runtime.

The wakeword detector of the DSP (and optionally implemented in the application software level of the device) may be used at runtime until the companion application's wakeword detector is trained using speech of the user. When the wakeword detector of the DSP (and optionally application software level) detects a wakeword, the wakeword detector makes audio data representing the spoken wakeword accessible to the companion application's wakeword detector for training purposes.

The companion application's wakeword detector may require audio data representing numerous spoken wakewords in order for the companion application's wakeword detector to be trained. Once the companion application's wakeword detector is trained, the device may deactivate the user trained model(s) of the DSP's (and optionally application software level's) wakeword detector. The companion application's wakeword detector may be considered better than the wakeword detector implemented in the DSP (and optionally application software level) because the companion application's wakeword detector may have access to additional input signals.

A system implementing the present disclosure may require user permission to perform the teachings herein. That is, a system may require a user opt in, with informed consent, prior to the system being able to implement the teachings herein with respect to the user.

FIG. 1 illustrates a system configured to detect user inputs using different wakeword detectors. Although the figures and discussion of the present disclosure illustrate certain operational steps of the system in a particular order, the steps described may be performed in a different order (as well as certain steps removed or added) without departing from the intent of the disclosure. A device 110 local to a user 5 may communicate with one or more servers 120 across one or more networks 199.

At some point in time, the device 110 may detect (128) a wakeword in received audio. An example wakeword is "Alexa." One or more different wakewords may also be used. After detecting the wakeword, the device 110 may determine whether a companion application is installed on the device 110. Such companion application may enable the device 110 to communicate with the server(s) 120 via the network(s) 199. If the device 110 determines the companion application is already installed, the device 110 may provide the user 5 with a prompt to provide the user 5's login information. The requested login information may be associated with a user profile stored by the server(s) 120. Once the device 110 receives the login information, the device 110 may send the login information (or an indication of same) to the server(s) 120. The server(s) 120 may then update a user profile (associated with the login information in a profile storage 270 discussed in detail below) to include updated endpoint information.

If the device 110 determines (130) the companion application is not installed on the device, the device 110 may prompt the user 5 to indicate whether the user 5 wants the companion application downloaded on the device 110. Thereafter, the device 110 may receive (132) a user input to install the companion application on the device 110. The user input may correspond to speech of the user or the user input may be a tactile input (e.g., selection of a virtual button on a touch sensitive interface of the device 110). The device 110 may download (134) the companion application from an application catalog and may install (136) the companion application in an application software level of the device 110.

After the companion application is installed, the device 110 may receive (138) user input requesting the companion application be associated with a particular user account. For example, the user input may correspond to a login request or a request to create a new user account.

The device may initially be configured with a first wakeword detection component that is configured to detect a wakeword, generally. That is, the first wakeword detection component may not be trained with respect to any particular user.

After the device 110 receives the user input requesting the companion application be associated with the particular user account, the device 110 may output (140) content requesting training of the first wakeword detection component using the user's speech. The content may be output as audio and/or may be displayed on a display associated with the device 110.

The device 110 receives (142) user input representing permission to train the first wakeword detection component using the user's speech. The permission may be spoken by the user 5 (in which case the speech may be captured by the device 110 as audio) or may be provided via a touch-sensitive surface of the device 110.

The device 110 thereafter outputs (144) content requesting the user provide particular speech a threshold number of times. The content may be output as audio and/or may be displayed on a display associated with the device 110. For example, the content may request the user speak a particular wakeword a number of times needed to train the first wakeword detection component with respect to how the user speaks the wakeword.

A wakeword is a word spoken by a user to elicit a certain function from a device or system. A keyword is an example of a specialized wakeword. For a wakeword, the associated function is typically to "wake" the device 110 so that the device 110 may capture audio following (or surrounding) the wakeword and send audio data to the server(s) 120 for speech processing. For speech processing enabled systems, the wakeword may be the only wakeword recognized by the system and all other words are processed using typical speech processing. In systems where other wakewords may be enabled, each respective wakeword may only be associated with a single respective function that is executed regardless of the operating context of the device. For example, saying "Alexa" (a wakeword) may activate speech processing components regardless of whatever else the system is doing. In another example, "shutdown" may be a configured keyword to shut off the system, also regardless of whatever else the system is doing.

The device 110 receives (146) audio representing the requested speech and trains (148) the first wakeword detection component using audio data representing the received audio. The first wakeword detection component may be implemented in a DSP of the device 110. The first wakeword detection component may also be distributed across the DSP and an executable application (that may be related to the DSP). For example, the DSP may be configured to use hardware to implement certain functionality using hardware while an executable application may be configured to implement certain functionality using software/firmware. Depending on the configuration of the device 110, the executable application may include an Android PacKage (APK) of the device 110. A DSP APK is a package file format used by the Android operating system for distribution and installation of mobile applications and middleware. The executable application may also include an iPhone Application (for use on an iPhone), windows mobile executable (for use on a windows device), or other application. In one configuration, the executable application may be installed on the device by an original equipment manufacturer. Accordingly, one skilled in the art will appreciate that a device 110 according to the present disclosure may implement a non-Android operating system and/or other software, firmware, or the like to perform the operations described herein.

While it is described that training of the first wakeword detection component may occur after the companion application is installed on the device 110, one skilled in the art will appreciate that the first wakeword detection component of the DSP (and optionally the executable application) may be trained prior to download and install of the companion application on the device 110. For example, steps 140-148 may be performed during an initial setup of the device 110.

After the first wakeword detection component is trained, the user 5 may speak a user input. The device 110 receives (150) audio representing the spoken user input and generates (152) a vector representing the audio. The device 110 may use the trained first wakeword detection component (implemented in the DSP and optionally the application software level) to determine (154) the vector corresponds to a first wakeword audio signature specific to the trained first wakeword detection component. In some examples, the vector may be determined to correspond to the first wakeword audio signature if a similarity between the vector and the first wakeword audio signature satisfies a similarly threshold.

At some point, the companion application may become configured to implement its own wakeword detection component. The companion application's wakeword detection component may be trained using speech of the user. If the companion application is configured with its own wakeword detection component, the device 110 may use (156) audio data, representing the spoken user input, or the vector to at least partially train the second wakeword detection component implemented by the companion application with respect to how the user speaks the wakeword.

The device 110 sends (158), via the companion application, the audio data (representing the spoken user input) to the server(s) 120. The server(s) 120 performs speech processing on the second audio data and determines first content responsive to the user input represented in the second audio data. The device 110 receives (160) the first content from the server(s) 120, for example via the companion application. The device 110 thereafter outputs (162) the first content to the user 5.

The second wakeword component (implemented by the companion application) may require various sample audio data and/or vectors representing the wakeword, as spoken by the user 5, to become trained. Thus, steps 150 through 162 may be performed with respect to multiple user inputs until the second wakeword detection component is trained.

After the second wakeword detection component (implemented by the companion application of the device 110) is trained, the device 110 may deactivate (164) the model(s) of the first wakeword detection component trained with respect to the user's voice (or may simply adjust the first wakeword detection component's accuracy). Such deactivation results in the first wakeword detection component functioning as it did prior to training using the user's voice. That is, about deactivation of the user trained model(s), the first wakeword detection component may detect spoken wakewords without specific regard to how the user speaks the wakeword.

By deactivating the user trained model(s) of the first wakeword detection component, the device 110 is able to save on battery usage. In some instances, leaving the user trained model(s) of the first wakeword detection component activated but adjusting its accuracy may save on battery usage. By deactivating the user trained model(s) of the first wakeword detection component but by still implementing the first wakeword detection component, the first key wakeword word detection component may act as a gatekeeper to invocation of the second wakeword detection component. The first wakeword detection component may use less computing resources than the second wakeword detection component. Thus, invoking the first wakeword detection component each time speech is detected and only invoking the second wakeword detection component if the first wakeword detection component detects the wakeword in the speech may result in less battery usage than invoking the second wakeword detection component each time speech is detected.

After the second wakeword detection component is trained, the user 5 may speak a further user input. The device 110 receives (166) the audio representing the further user input and generates (168) a vector representing the audio. The device 110 may use the first wakeword detection component to determine (169) the vector corresponds to a wakeword. Thereafter, the device 110 may use the trained second wakeword detection component to determine (170) the vector corresponds to a second wakeword audio signature specific to the trained second wakeword detection component (e.g., may determine the vectors corresponds to a voice of the user whose speech was used to train the second wakeword detection component). In some examples, the vector may be determined to correspond to the second wakeword audio signature if a similarity between the vector and the second wakeword audio signature satisfies a similarly threshold. Since the training data used to train the second wakeword detection component is different from the training data used to train the first wakeword detection component, the second wakeword audio signature used by the second wakeword detection component may be different from the first wakeword audio signature used by the first wakeword detection component.

The device 110 sends (172), via the companion application, audio data (representing the further spoken user input) to the server(s) 120. The server(s) 120 performs speech processing on the third audio data and determines second content responsive to the user input represented in the third audio data. The device 110 receives (174) the second content from the server(s) 120, for example via the companion application. The device 110 thereafter outputs (176) the second content to the user 5. As can be appreciated, in certain embodiments the DSP, executable application, and companion application may be different components while in other embodiments certain of their functionality may be combined into fewer components.

Figure 2A:
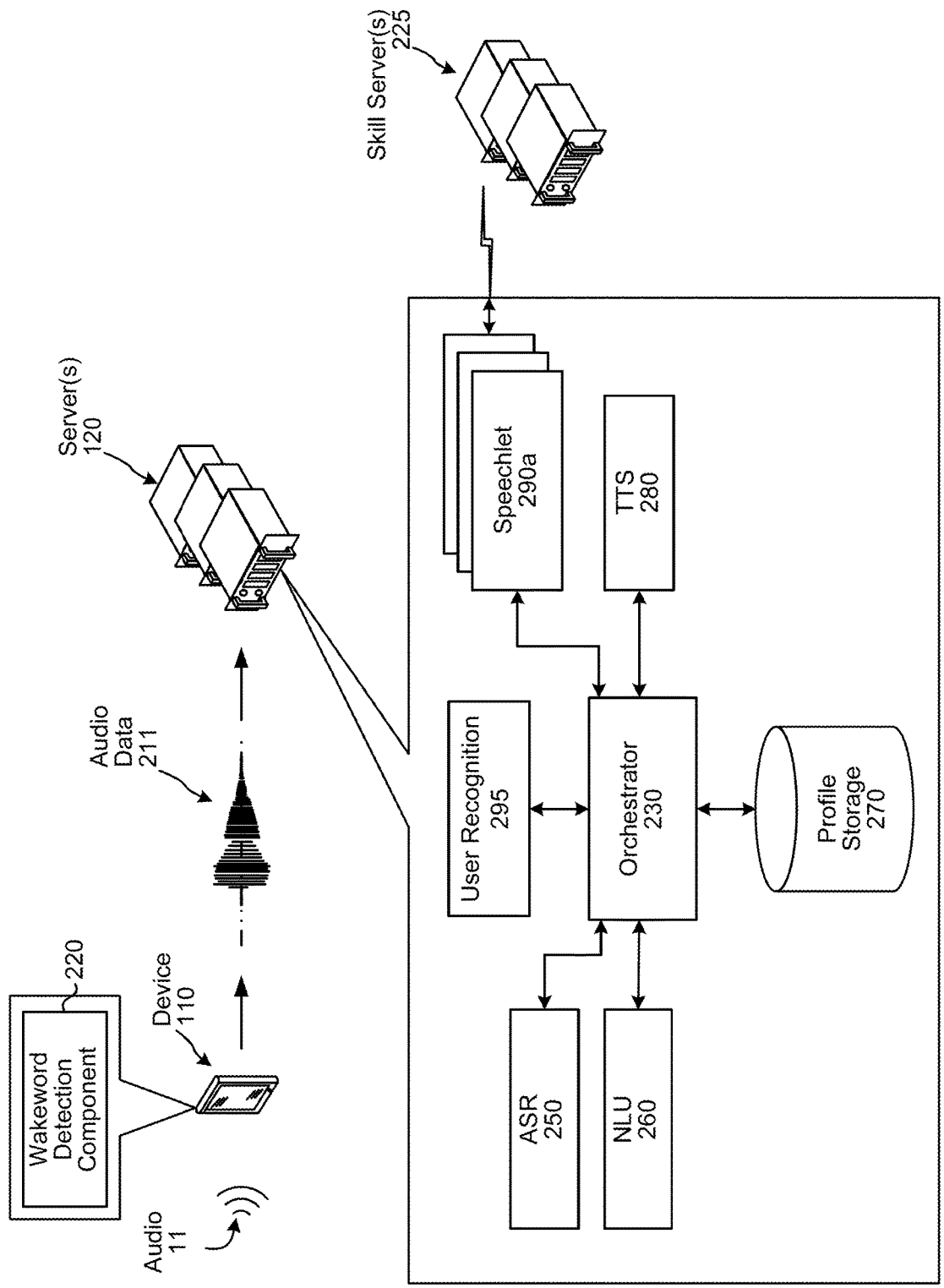
FIG. 2A is a conceptual diagram of components of a system according to embodiments of the present disclosure.

The system may operate using various components as described in FIG. 2A. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. The wakeword detection component 220 is a specific example of a wakeword detection component. This process may also be referred to as wakeword detection, with a wakeword being a specific example of a wakeword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Figure 2B:
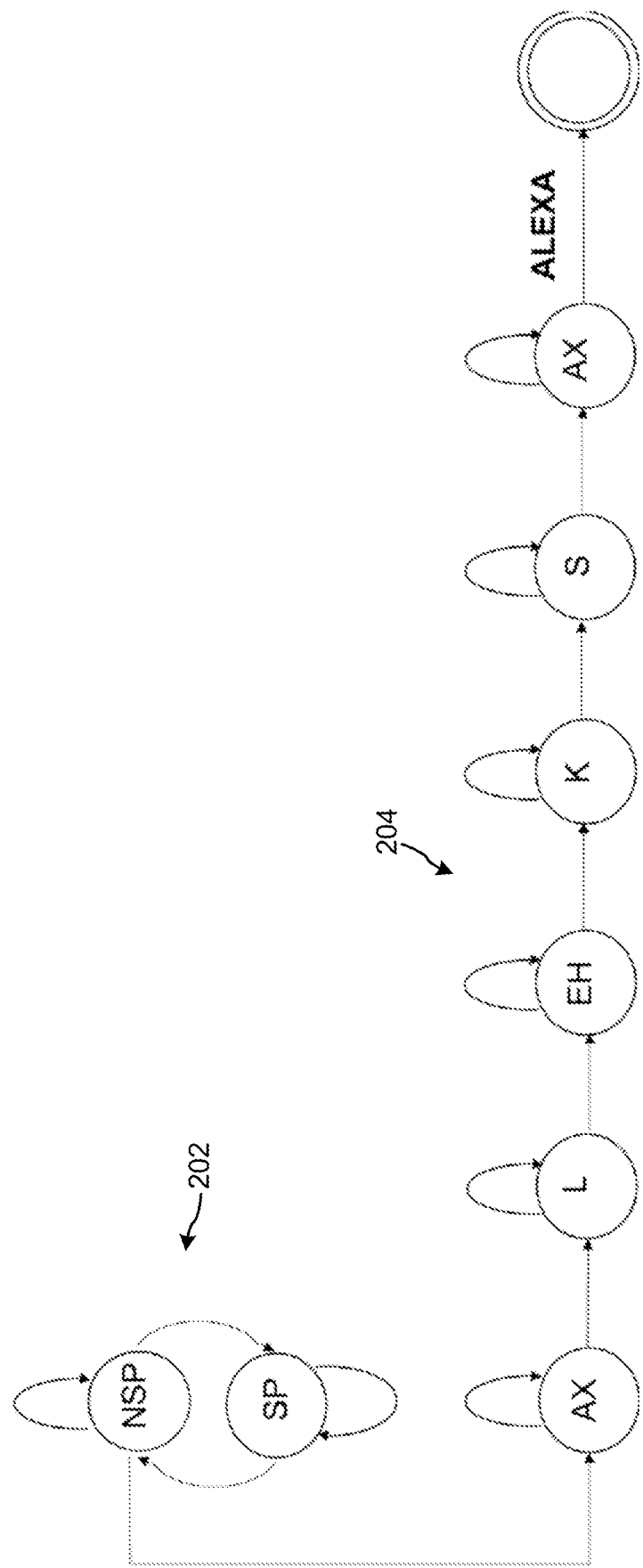
FIG. 2B is a conceptual diagram illustrating how wakeword detection is performed according to embodiments of the present disclosure.

In an example, as illustrated in FIG. 2B, the wakeword detection component 220 may implement a Hidden Markov Model (HMM) with a foreground wakeword path 204 and a background speech/nonspeech path 202. The foreground wakeword path 204 represents states corresponding to phonemes of the wakeword. Although other wakewords may be used, in this example the wakeword is "Alexa" represented by phonemes of <AX> for the initial "A" sound of "Alexa," <L> for the "L" sound, <EH> for the "E" sound, <K> and <S> for the combined "X" sound, followed by <AX> for the final "A" sound. Viterbi decoding may be performed for the competing foreground wakeword path and background speech/nonspeech path, and wakeword hypothesis may be triggered when a log-likelihood ratio of the foreground path versus the background path exceeds a predetermined threshold. Once the ratio exceed the predetermined threshold, features may be extracted from the audio data and fed into one or more second stage classifiers, which could be a support vector machine (SVM) or deep neural network (DNN). The second stage classifier(s) may determine if the features correspond to a wakeword or not.

Once the wakeword is detected, the device 110 may "wake" and begin transmitting audio data 211, representing the audio 11, to the server(s) 120. The audio data 211 may include data corresponding to the wakeword, or the portion of the audio corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to an ASR component 250. The ASR component 250 transcribes the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrase(s) or statement(s) represented in the text data input therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the server(s) 120, a speechlet component 290, a skill server(s) 225, etc.) to execute the intent. For example, if the text data corresponds to "play Adele music," the NLU component 260 may determine an intent that the system output music and may identify "Adele" as an artist. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5.

The NLU results data may be sent from the NLU component 260 (which may include tagged text data, indicators of intent, etc.) to a speechlet component(s) 290. If the NLU results data includes a single NLU hypothesis, the NLU component 260 may send the NLU results data to the speechlet component(s) 290 associated with the NLU hypothesis. If the NLU results data includes an N-best list of NLU hypotheses, the NLU component 260 may send the top scoring NLU hypothesis to a speechlet component(s) 290 associated with the top scoring NLU hypothesis.

A "speechlet component" may be software running on the server(s) 120 that is akin to a software application running on a traditional computing device. That is, a speechlet component 290 may enable the server(s) 120 to execute specific functionality in order to provide data or produce some other requested output. The server(s) 120 may be configured with more than one speechlet component 290. For example, a weather service speechlet component may enable the server(s) 120 to provide weather information, a car service speechlet component may enable the server(s) 120 to book a trip with respect to a taxi or ride sharing service, a restaurant speechlet component may enable the server(s) 120 to order a pizza with respect to the restaurant's online ordering system, etc. A speechlet component 290 may operate in conjunction between the server(s) 120 and other devices, such as the device 110, in order to complete certain functions. Inputs to a speechlet component 290 may come from speech processing interactions or through other interactions or input sources. A speechlet component 290 may include hardware, software, firmware, or the like that may be dedicated to a particular speechlet component 290 or shared among different speechlet components 290.

A skill server(s) 225 may communicate with a speechlet component(s) 290 within the server(s) 120 and/or directly with the orchestrator component 230 or with other components. A skill server(s) 225 may be configured to perform one or more actions. An ability to perform such action(s) may sometimes be referred to as a "skill." That is, a skill may enable a skill server(s) 225 to execute specific functionality in order to provide data or perform some other action requested by a user. For example, a weather service skill may enable a skill service(s) 225 to provide weather information to the server(s) 120, a car service skill may enable a skill server(s) 225 to book a trip with respect to a taxi or ride sharing service, an order pizza skill may enable a skill server(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may be configured with a speechlet component 290 dedicated to interacting with the skill server(s) 225.

Unless expressly stated otherwise, reference to a speechlet, speechlet device, or speechlet component may include a speechlet component 290 operated by the server(s) 120 and/or skill operated by the skill server(s) 225. Moreover, the functionality described herein as a speechlet or skill may be referred to using many different terms, such as an action, bot, app, or the like.

The server(s) 120 may include a TTS component 280 that generates audio data (e.g., synthesized speech) from text data using one or more different methods. Text data input to the TTS component 280 may come from a speechlet component 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include a user recognition component 295 that recognizes one or more users associated with data input to the system. The user recognition component 295 may take as input the audio data 211 and/or text data output by the ASR component 250. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art.

The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations.

Output of the user recognition component 295 may include a single user identifier corresponding to the most likely user that originated the user input. Alternatively, output of the user recognition component 295 may include an N-best list of user identifiers with respective scores indicating likelihoods of respective users originating the user input. The output of the user recognition component 295 may be used to inform NLU processing as well as processing performed by other components of the system.

The server(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to a companion application installed on a device 110, the user profile (associated with the presented login information) may be updated to include information about the device 110.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 3 illustrates example wakeword detection components of the device 110. The device 110 may include a firmware level 302, an operating system 304, and an application software level 306. The firmware level 302 may include a DSP 308 configured to implement a wakeword detection component 310.

The application software level 306 may include an executable application 312 (that is associated with the DSP 308) also configured to implement a wakeword detection component 314. Thus, one skilled in the art will appreciate that the model(s) implemented by the wakeword detection component 314 (referred to as the first wakeword detection component with respect to FIGS. 1A through 1D) may be wholly implemented by the executable application 312 or distributed to be implemented by both the executable application 312 and the DSP 308.

Sometime after the user 5 receives the device 110 (for example, when the user 5 indicates the user 5 wants to set up speech based inputs to the device 110), a user training component 316 of the executable application 312 may request the user 5 provide permission to use the user's speech to train the wakeword detection component 314. If the user 5 provides such permission (e.g., in the form of verbal consent, consent given via a touch sensitive surface, or consent given through some other modality), the executable application 312 may use subsequently received user speech to train the wakeword detection component 314. As described with respect to FIG. 1A, the speech used to train the wakeword detection component 314 may correspond to a particular wakeword (or other speech) spoken in response to a prompt output by the device 110.

The user training component 316 may be implemented by the server(s) 120 rather than the device 110. In such an implementation, captured speech of the user may be sent to the server(s) 120. The server(s) 120 may train a machine learning model(s) using the speech. Once the machine learning model(s) is trained, the server(s) 120 may send the trained model(s) to the device 110 so the wakeword detection component 314 can implement the trained model(s) (trained using the user's speech).

Once the wakeword detection component 314 is trained, the wakeword detection component 314 may be used to determine whether received audio includes a wakeword. The output of the wakeword detection component 310 may be a binary yes/no output, whereby a "yes" output indicates the wakeword was detected in the received audio and spoken by the user whose speech was used to train the wakeword detection component 314, and a "no" output indicates the wakeword was not detected in the received audio (or the wakeword was detected but the wakeword detection component 314 is not confident that the user, whose speech was used to train the wakeword detection component 314, spoke the wakeword).

In an example, the wakeword detection component 310 (as implemented by the DSP 308) may be configured to detect whether a wakeword was spoken and the wakeword detection component 314 (as implemented by the executable application 312) may be configured to determine whether the detected spoken wakeword was spoken by the user whose speech was used to train the wakeword detection component 314. For example, the wakeword detection component 310 (as implemented by the DSP 308) may implement one or more trained models configured to detect a wakeword and the wakeword detection component 314 (as implemented by the executable application 312) may implement one or more trained models configured to detect whether the user 5 spoke the wakeword.

The application software level 306 may also include a companion application 320. At some point in time (e.g., via a software update after the companion application 320 has already been installed on the device 110), the companion application 320 may be configured to implement a wakeword detection component 322.

When the companion application 320 becomes configured to implement the wakeword detection component 322, the wakeword detection component 322 may not be trained. The wakeword detection component 322 may be trained using user speech at runtime. The system may seek further user permission to use the user's speech to train the wakeword detection component 322, or the user permission provided to train the wakeword detection component 314 may be sufficient to provide the user permission needed to train the wakeword detection component 322.

After the companion application 320 becomes configured to implement the wakeword detection component 322, the user 5 may speak an input to the device 110, with the input including a wakeword. Since the wakeword detection component 322 has yet to be trained, the wakeword detection component 314 may be used to determine whether the user input includes the wakeword as well as whether the user 5 spoke the wakeword. If the wakeword detection component 314 determines the user input includes the wakeword and that the user 5 spoke the wakeword, the executable application 312 may send, to the companion application 320 (e.g., via a bridging component 318), audio data representing the entirety of the user input or audio data representing the portion of the input corresponding to the wakeword. The companion application 320 uses the received audio data to train its wakeword detection component 322. The bridging component 318 may be a component that has protocols that enables the executable application 312 to communicate with the companion application 320.

Training of the wakeword detection component 322 may require various samples of user speech prior to the wakeword detection component 322 being fully trained. Thus, the foregoing processes relating to the wakeword detection component 314 being used to detect wakewords in audio that are spoken by the user 5 and the companion application 320 using audio data to train the wakeword detection component 322 may be performed until the wakeword detection component 322 is fully trained.

The companion application 320 may send, to the executable application 312 and after a new portion of audio data representing a new user input is received by the companion application 320, an indicator of whether more audio data is needed to train the wakeword detection component 322. By sending such an indicator, a situation is prevented whereby the executable application 312 uses computing resources to package audio data for training of the wakeword detection component 322 when the wakeword detection component 322 does not require any further audio data for training.

Once the wakeword detection component 322 is trained, the user trained model(s) of the wakeword detection component 314 may be deactivated. Thus, after the wakeword detection component 322 is trained, the wakeword detection component 310 may determine whether a wakeword is present in speech, and the wakeword detection component 322 may determine whether the user 5 spoke the wakeword.

Signals causing the deactivation of the user trained model(s) of the wakeword detection component 314 may originate from various sources depending on implementation. In an example, the companion application 320 may send a signal to deactivate the user trained model(s) of the wakeword detection component 314 to the executable application 312 and the executable application 312 may generate and send a second signal to deactivate any user trained model(s) to the wakeword detection component 310. In a further example, the companion application 320 may send a signal, to the server(s) 120, indicating the wakeword detection component 322 has been trained. In response, the server(s) 120 may send one or more signals to the device 110 (e.g., via the companion application 320), causing the user trained model(s) of the wakeword detection component 314 to be deactivated. The present disclosure is envisioned to cover any DSP 308 and associated executable application 312 that are capable of having their user trained model(s) deactivated once the wakeword detection component 322 is trained.

The wakeword detection component 322 may be continually trained, over time. For example, the wakeword detection component 322 may receive data indicating a temperature of a day when a user input is received and may be retrained based on temperature (as some users' octaves or decibels may change based on how hot or cold it is).

The wakeword detection components (310/314/322) implemented by the device 110 may have different capabilities due to the amount and types of signals input to the wakeword detection components, respectively. The wakeword detection component 310 (as implemented by the DSP 308) may be a rather simple wakeword detection component that produces a significant amount of false positives. However, the wakeword detection component 310 may act as a beneficial gatekeeper to limit the amount of times the companion application 320 is invoked to detect a wakeword. Even if the wakeword detection component 310 (as implemented by the DSP 308) causes the companion application 320 to be invoked in instances where speech does not include a wakeword, the wakeword detection component 310 (as implemented by the DSP 308) may, in some instances, determine speech does not include a wakeword and prevent the companion application 320 from being invoked. The wakeword detection component 310 (as implemented by the DSP 308) may be configured to only prevent the companion application 320 from being invoked if the wakeword detection component's confidence of detecting a wakeword is below a threshold confidence. The threshold confidence may be set relatively low as the battery usage saved by preventing the unbeneficial invocation of the companion application 320 may be outweighed by the detriment of preventing a user input from being processed.

The wakeword detection component 322 may be considered the most complex wakeword detection component implemented by the device 110 because it is capable of receiving the most types of signals. Moreover, the wakeword detection component 322 may be linked to a particular user identifier (and thereby linked to a particular user profile in the profile storage 270) based on the companion application's ability to communicate with the server(s) 120.

Since the trained models of the wakeword detection component 322 may be associated with a particular user profile, the trained models may be stored by the server(s) 120 in addition to being implemented by the device 110. If the same user installs the companion application on a different device, the server(s) 120 may be able to push the already trained models to a wakeword detection component implemented by the companion application installed on the new device. If the audio capture capabilities (e.g., based on microphone location, number of microphones, microphone(s) capture capabilities, etc.) of the device 110 are the same or similar to the audio capture capabilities of the new device, the wakeword detection component of the companion application installed on the new device may simply be able to implement the trained models without further training. If, instead, the audio capture capabilities of the device 110 and the new device are significantly different, the wakeword detection component of the companion application installed on the new device may still need to be trained. However, the wakeword detection component on the new device may use the trained models as a starting point. Thus, training of the wakeword detection component on the new device may require less sample speech than was required to initially train the models of the wakeword detection component 322 in the first instance.

As described, the wakeword detection component 322 is trained as user inputs are received by the device 110 at runtime. In some implementations, audio data representing spoken wakewords or entire user inputs (and/or vectors representing the audio data) may be buffered until enough audio data (and/or vectors) is stored to fully train the wakeword detection component 322. Once enough audio data (and/or vectors) is stored, the stored audio data (and/or vectors) may be used to train the wakeword detection component 322. The companion application 320 may output, to the executable application 312 via the bridging component 318, an indication of how much audio data (and/or vectors) is needed to train the wakeword detection component 322 so the executable application 312 knows how much audio data (and/or vectors) to buffer.

A threshold amount of audio data (and/or vectors) needed to fully train the wakeword detection component 314 may be different than a threshold amount of audio data (and/or vectors) needed to fully train the wakeword detection component 322. The threshold amount of audio data (and/or vectors) needed to train a wakeword detection component may depend on whether the audio data (and/or vectors) represent entire user inputs or only portions of the user inputs corresponding to spoken wakewords. For privacy considerations, the device 110 may buffer vectors representing the user's speech, rather than audio data directly corresponding to the user's speech.

If the device 110, implementing the wakeword detection components (314/322), captures speech using one or more near-field microphones, the trained wakeword detection components (314/322) may be considered to implement near-field trained models. Near-field refers to audio capture capabilities of up to about 3 meters.

As described above, the wakeword detection components 314 and 322 may be trained using audio data (and/or vectors) representing entire user inputs or portions of the user inputs corresponding to the wakeword. At least the wakeword detection component 322 may also be trained using other data.

The wakeword detection component 322 may be trained using location data. A user 5 may speak differently depending on where the user 5 is (e.g., whether the user 5 is at home or at work). Data representing a location of the device (e.g., data representing Wi-Fi or Bluetooth connection to a particular location, global position system (GPS) information, etc.) when the user input is received may be used when audio data (and/or a corresponding vector) representing the user input is used to train the wakeword detection component 322. After the wakeword detection component 322 is trained using location data, the device's location may be used to more accurately determine whether received speech includes a wakeword.

As described, the wakeword detection components 314 and 322 may be trained on the device 110. Alternatively, the models to be implemented by the wakeword detection components 314 and/or 322 may be trained by the server(s) 120 and sent to the respective wakeword detection component 314 or 322 once trained. Thus, the audio data (and/or vectors) representing user speech of entire user inputs, or just wakeword portions of the user inputs, may be sent to the server(s) 120 via the companion application 320; the server(s) 120 may train one or more models using the audio data (and/or vectors); and thereafter the server(s) 120 may send the trained model(s) to the device 110, for example via the companion application 320.

The trained wakeword detection components implemented by the device 110 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the components including backpropagation, statistical learning, supervised learning, semi-supervised learning, stochastic learning, or other known techniques.

The trained wakeword detection component 322 of the companion application 320 may be implemented in different manners. In an example, the wakeword detection component 322 may be configured to detect a wakeword but only cause the device 110 to wake and send audio data (representing user input) to the server(s) 120 if the wakeword detection component 322 also detects the wakeword was spoken by the user 5 whose speech was used to train the wakeword detection component 322. Such a configuration prevents an individual from using a different individual's device. In another example, the wakeword detection component 322 may be configured to detect a wakeword and cause the device 110 to wake and send audio data (representing user input) to the server(s) 120 regardless of whether the wakeword detection component 322 detects the wakeword was spoken by the user 5 whose speech was used to train the wakeword detection component 322.

Figure 4:
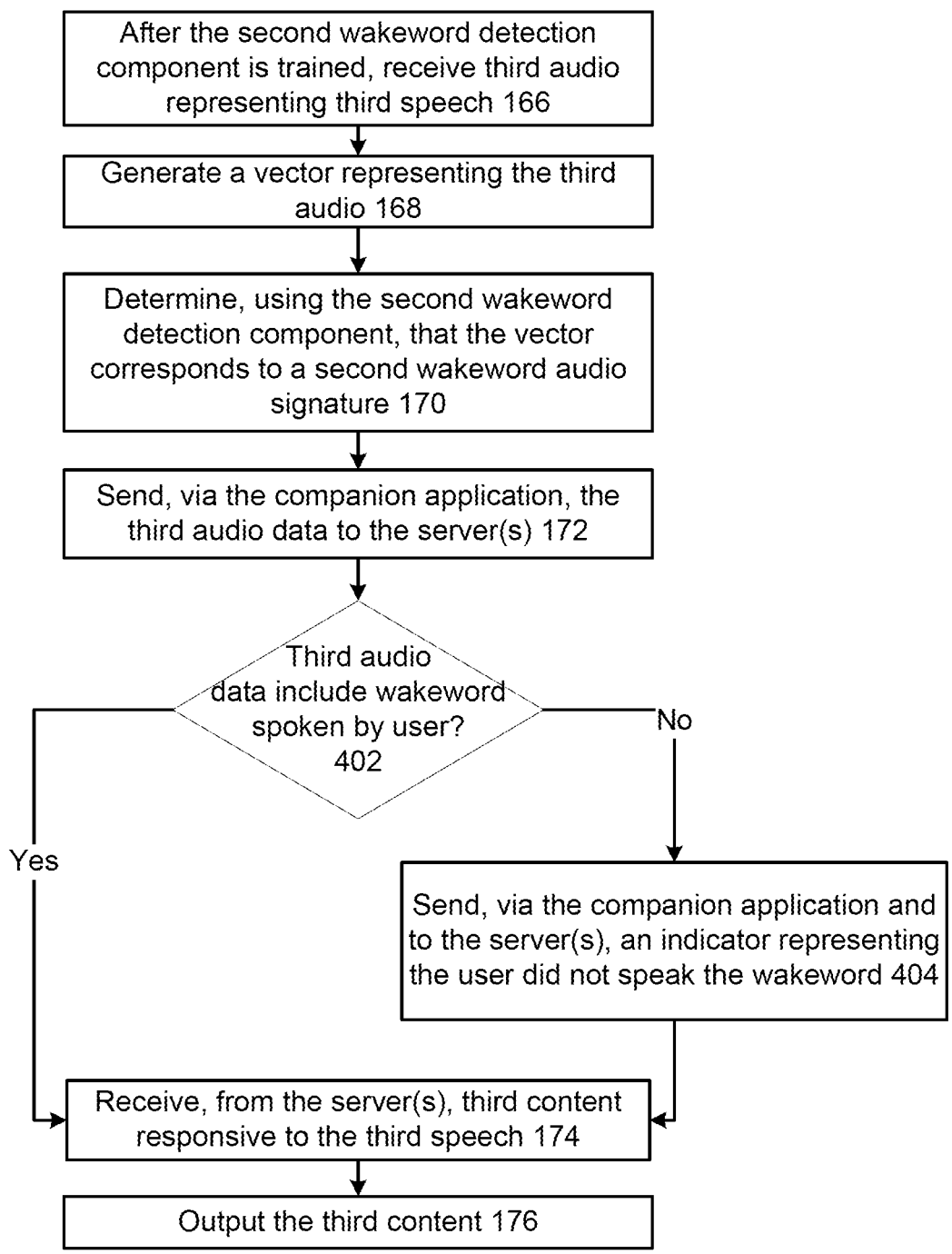
FIG. 4 is a process flow diagram illustrating processing performed after a companion application's wakeword detection component is trained according to embodiments of the present disclosure.

FIG. 4 illustrates processing that may be performed after the companion application's wakeword detection component 322 is trained. As described above, after the companion application's wakeword detection component 322 is trained, the device 110 receives (166) audio representing speech and generates (168) a vector representing the audio. The companion application's wakeword detection component 322 is used to determine (170) the vector corresponds to a wakeword audio signature. After determining the vector corresponds to the wakeword audio signature, the companion application 320 sends (172) audio data representing the user input to the server(s) 120.

In performing wakeword detection, the wakeword detection component 322 may be configured to determine (402) whether the detected wakeword was spoken by the user 5 whose speech was used to train the wakeword detection component 322. The wakeword detection component 322 may determine such by comparing speech characteristics of the received speech to speech characteristics used to train the wakeword detection component 322. The wakeword detection component 322 may output a binary indicator (e.g., a binary "yes" or "no") representing same.

If the wakeword detection component 322 determines the user 5, whose speech was used to train the wakeword detection component 322, spoke the presently input wakeword, the companion application 320 may simply wait to receive (174) content, from the server(s) 120, responsive to the user input. If, instead, the wakeword detection component 322 determines the user 5, whose speech was used to train the wakeword detection component 322, did not speak the presently input wakeword, the companion application 320 may send (404), to the server(s) 120, an indicator representing the user did not speak the wakeword.

The server(s) 120 may use the indicator to control post-NLU processing. The server(s) 120 may perform ASR processing on the received audio data to generate text data, and may perform NLU processing on the text data to generate NLU results.

The server(s) 120 may store a whitelist of intents that may be invoked by an individual whose speech was not used to train the wakeword detection component 322. In addition or alternatively, the server(s) 120 may store a blacklist of intents that may not be invoked by an individual whose speech was not used to train the wakeword detection component 322.

The server(s) 120 may compare the NLU results to the whitelist and/or blacklist. Whitelisted intents may include non-private intents, such as a <TellJoke> intent, an <OutputWeather> intent, an <OutputTime> intent, and the like. Blacklisted intents include private intents, such as an <UnlockDoor> intent, an <OutputBankAccountInformation> intent, and the like.

If a top scoring NLU hypothesis in the NLU results includes an intent that is represented in the whitelist (and/or not represented in the blacklist), the server(s) 120 may cause a speechlet component 290 to execute with respect to the NLU results. If the top scoring NLU hypothesis includes an intent that is not represented in the whitelist (and/or is represented in the blacklist), the server(s) 120 may generate synthesized speech representing the user input could not be processed.

The device 110 receives (174), from the server(s) 120, content responsive to the user input. The content may be content originating from a speechlet component 290 or the content may be audio data corresponding the synthesized speech representing the user input could not be processed. The device 110 thereafter outputs (176) the content.

In some systems, a device 110 may be configured to implement machine learning models trained using different users' speech, resulting in the device 110 being configured to determine which user, or more than one user, is speaking a wakeword. Such a device 110 may include a vehicle. A first learned model(s) may represent how a first user speaks a wakeword and a second learned model(s) may represent how a second user speaks the wakeword. The device 110 may use user presence information (e.g., determine based on facial recognition, which user's key a vehicle detects, etc.) to determine which user's learned model(s) to implement in a given situation. For example, if a first user's key is detected by a vehicle, the vehicle may implement the first user's trained model(s) to attempt to detect a wakeword in detected speech. In an alternative implementation, the server(s) 120 may store the learned models, the device 110 may send an indication of the detected user to the server(s) 120, and the server(s) 120 may send the user's learned model(s) to the device 110.

Figure 5:
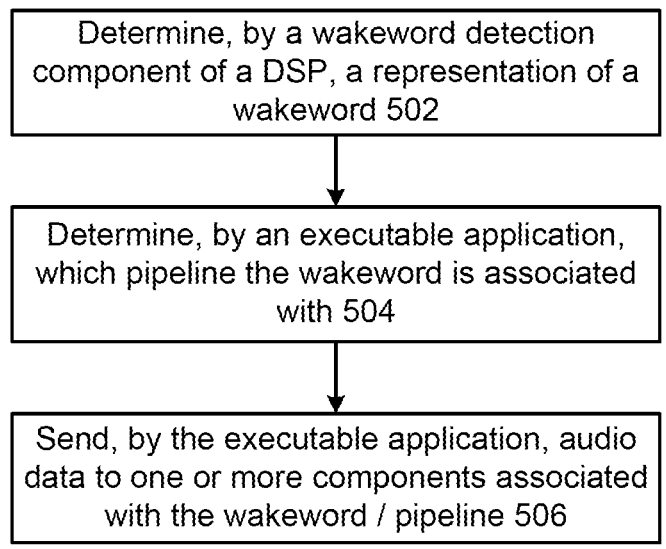
FIG. 5 is a profiles flow diagram illustrating how a device may be configured to detect wakewords associated with different entities according to embodiments of the present disclosure.

FIG. 5 illustrates how the device 110 may be configured to detect wakewords associated with different entities. In some implementations, the wakeword detection component 310, as implemented in the DSP 308, may be configured to determine (502) a representation of a wakeword in audio data. The wakeword detection component 310, of the DSP 308, may be configured to detect various wakewords associated with different entities. For example, the device may be configured to detect a first wakeword (e.g., "Alexa") that is associated with a particular companion application 320 and one set of corresponding server(s) 120. If that first wakeword is detected, the companion application may be activated and further communications may happen with that set of corresponding server(s) 120. The device may also be configured to detect a different second wakeword (e.g., "Ok Google") that is associated with a different companion application 320 and a different set of corresponding server(s) 120. If that second wakeword is detected, the different companion application may be activated and further communications may happen with the different set of corresponding server(s) 120.

The system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

The DSP 310 may generate, for each detectable wakeword, a confidence value representing the DSP's confidence that speech includes the wakeword. The executable application 312 may be configured to determine (504) which pipeline the wakeword is associated with. For example, the executable application 312 may store or otherwise have access to audio signatures of different wakewords, and each audio signature may be associated with a different speech processing pipeline. The executable application 312 may thus process the audio data to determine which wakeword's audio signature is represented in the audio data, and therefrom determine a speech processing pipeline associated with the spoken wakeword. The executable application 312 may generate, for each wakeword audio signature, a confidence value representing the executable application's confidence that wakeword audio signature is represented in received audio data.

The executable application 312 then sends (506) the audio data to one or more components of the device 110 associated with the wakeword/pipeline (associated with the wakeword audio signature with the highest confidence value.) For example, if the executable application 312 determines a first pipeline's wakeword audio signature with the highest confidence value, the executable application 312 may send audio data, representing at least a user input associated with the wakeword, to a companion application 320 (or other component(s) of the device 110) associated with the first pipeline. Thus, one skilled in the art will appreciate that a user may speak inputs, which are directed to different speech processing systems, to a single device 110 and the device's executable application 312 may be configured to ensure the appropriate system receives the user input for processing.

As detailed above, the server(s) 120 may include a user recognition component 295 that recognizes one or more users using a variety of data. The device 110 may also include a user recognition component 295. The device 110 may use the user recognition component 295 in conjunction with the trained wakeword detection component(s) (314/322) to determine whether the user, whose speech was used to train the wakeword detection component(s), spoke a wakeword in received audio.

Figure 6:
FIG. 6 is a schematic diagram of an illustrative architecture in which sensor data is combined to recognize one or more users according to embodiments of the present disclosure.

As illustrated in FIG. 6, the user recognition component 295 may include one or more subcomponents including a vision component 608, an audio component 610, a biometric component 612, a radio frequency (RF) component 614, a machine learning (ML) component 616, and a recognition confidence component 618. In some instances, the user recognition component 295 may monitor data and determinations from one or more subcomponents to determine an identity of one or more users associated with data input to the system. The user recognition component 295 may output user recognition data 295, which may include a user identifier associated with a user the system believes is originating data input to the system. The user recognition data 295 may be used to inform processes performed by the orchestrator 230 (or a subcomponent thereof) as described below.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 295 may utilize determinations from additional components to determine an identity of a user. The vision component 608 can be used in conjunction with other components to determine an identity of a user. For example, the user recognition component 295 may use data from the vision component 608 with data from the audio component 610 to identify what user's face appears to be speaking at the same time audio is captured by the device 110 for purposes of identifying a user who spoke an input to the device 110.

The device 110 may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user.

The RF component 614 may use RF localization to track devices that a user may carry or wear. For example, a user may be associated with a device. The device may emit RF signals (e.g., Wi-Fi, Bluetooth®, etc.). The device 110 may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, the device 110 may include some RF or other detection processing capabilities so that a user who speaks an input may scan, tap, or otherwise acknowledge his/her personal device to the device 110. In this manner, the user may "register" with the device 110 for purposes of the device 110 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends into determining the identity of the user that provided input to the device 110. Thus, the ML component 616 may use historical data and/or usage patterns over time to increase or decrease a confidence level of an identity of a user.

In some instances, the recognition confidence component 618 receives determinations from the various components 608, 610, 612, 614, and 616, and may determine a final confidence level associated with the identity of a user. The confidence level or other score data may be included in the user recognition data 695.

The audio component 610 may receive data from one or more sensors capable of providing an audio signal (e.g., one or more microphones) to facilitate recognizing a user. The audio component 610 may perform audio recognition on an audio signal to determine an identity of the user and associated user identifier. In some instances, the audio component 610 may perform voice recognition to determine an identity of a user.

The audio component 610 may also perform user identification based on audio received by the device 110. The audio component 610 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 610 may perform user recognition by comparing audio characteristics representing the audio to stored audio characteristics of users.

Figure 7:
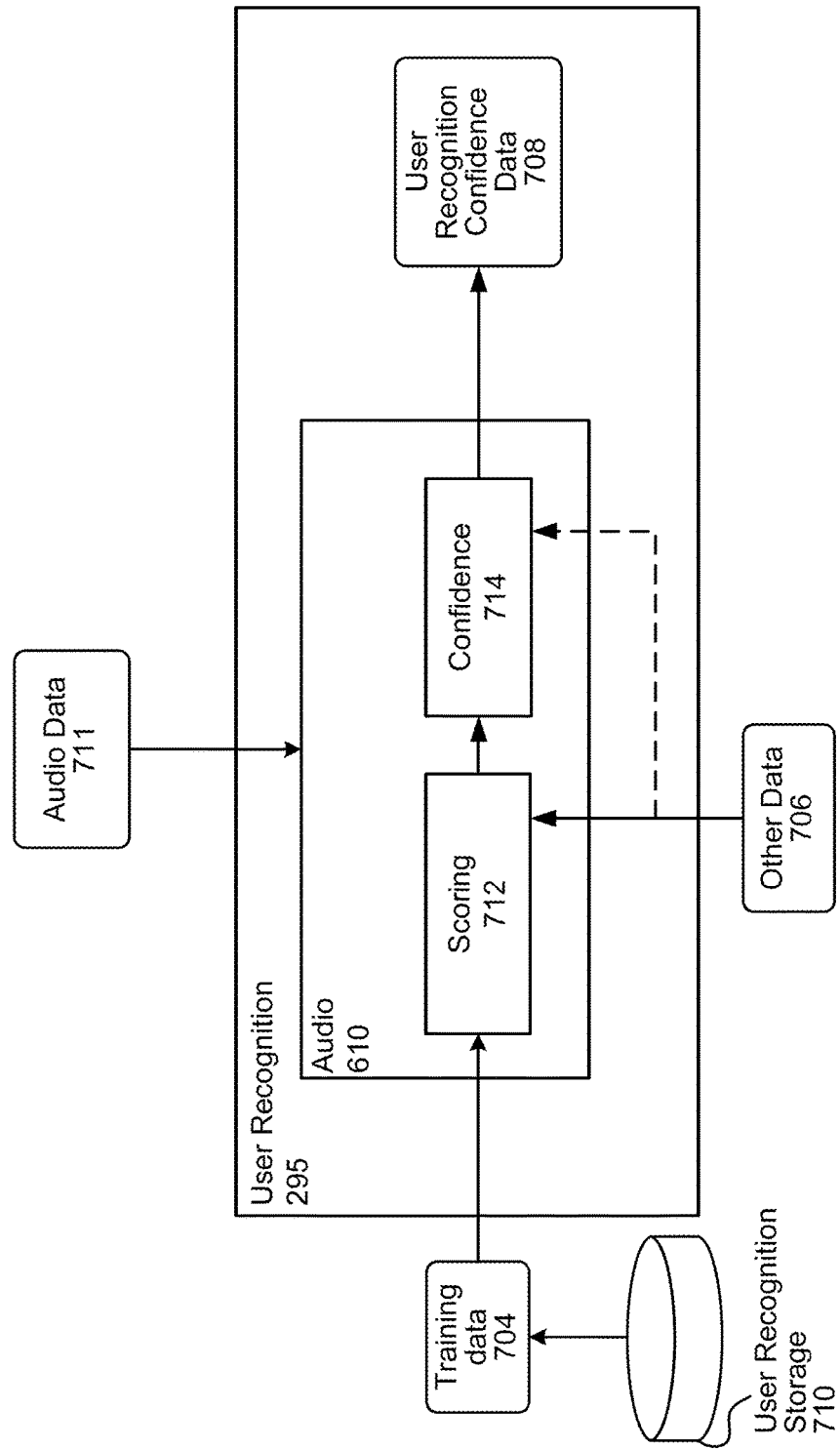
FIG. 7 is a system flow diagram illustrating user recognition processing according to embodiments of the present disclosure.

FIG. 7 illustrates the audio component 610 of the user recognition component 295 performing user recognition using audio data 711 representing speech. The audio component 610 may output user recognition confidence data 708 that reflects a certain confidence that the audio data 711 represents speech originating from the user 5.

Training data 704 may be stored in a user recognition storage 710. The training data 704 may include the audio data (and/or vectors) used to train the wakeword detection component(s) (314/322).

The training data 704 stored in the user recognition storage 710 may be stored as waveforms and/or corresponding features/vectors. The training data 704 may correspond to data from various audio samples. The audio samples may correspond to voice profile data for the user 5. Thus, the training data 704 may include a biometric representation of the user's voice. The audio component 610 may use the training data 504 to compare against the audio data 711 to determine whether the user 5 spoke the speech represented in the audio data 711.

If the audio component 610 receives training data 704 as an audio waveform, the audio component 610 may determine features/vectors of the waveform(s) or otherwise convert the waveform(s) into a data format (e.g., fingerprint) that can be used by the audio component 610 to actually perform user recognition. Likewise, if the audio component 610 receives the audio data 711 as an audio waveform, the audio component 610 may determine features/vectors of the waveform(s) or otherwise convert the waveform(s) into a fingerprint unique to the audio data 711. A fingerprint may be unique but irreversible such that a fingerprint is unique to underlying audio data but cannot be used to reproduce the underlying audio data. The audio component 610 may determine the user 5 spoke the speech represented in the audio data 711 by comparing features/vectors/fingerprint representing the audio data 711 to training features/vectors/fingerprint received from the user recognition storage 710.

The audio component 610 may include a scoring component 712 that determines a score the audio component's confidence that the speech was spoken by the user 5. The audio component 610 may also include a confidence component 714 that determines an overall confidence of the user recognition operations (such as those of the scoring component 712). The output from the scoring component 712 may include the score for the user 5. Although illustrated as two separate components, the scoring component 712 and confidence component 714 may be combined into a single component or may be separated into more than two components.

The scoring component 712 and confidence component 714 may implement one or more trained machine learning models (such neural networks, classifiers, etc.) as known in the art. For example, the scoring component 712 may use probabilistic linear discriminant analysis (PLDA) techniques. PLDA scoring determines how likely it is that an audio data feature vector corresponds to a particular training data feature vector associated with a particular user identifier. The PLDA scoring may generate a similarity score for the training feature vector considered and may output the score, representing the likelihood that the user 5 spoke the audio. The scoring component 712 may also use other techniques such as GMMs, generative Bayesian models, or the like to determine similarity scores.

The confidence component 714 may input various data including audio length (e.g., number of frames of the audio data 711), audio condition/quality data (such as signal-to-interference data or other metric data), fingerprint data, image data, or other data to consider how confident the audio component 610 is with regard to the score representing the user 5 spoke the speech. Precise determination of the confidence score may depend on configuration and training of the confidence component 714 and the models used therein. The confidence component 714 may operate using a number of different machine learning models/techniques such as GMM, neural networks, etc. For example, the confidence component 714 may be a classifier configured to map a score output by the scoring component 712 to a confidence.

The audio component 610 may output user recognition confidence data 708 representing the audio component's confidence that the user 5 spoke the speech. The user recognition confidence data 708 may include a particular score (e.g., 0.0-1.0, 0-1000, or whatever scale the system is configured to operate). Alternatively or in addition, the user recognition confidence data 708 may include a binned recognition indicator. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high."

The user recognition component 295 may combine data from components 608-618 to determine the identity of the user 5. As part of its audio-based user recognition operations, the audio component 610 may use other data 706 to inform user recognition processing. A trained model or other component of the audio component 610 may be trained to take other data 706 as an input feature when performing recognition. The other data 706 may include a wide variety of data types depending on device configuration. The other data 706 may include a time of day at which the audio data 711 was captured, a day of a week in which the audio data 711 was captured, image data or video data, device 110 location data, and/or other data.

The user recognition confidence data 708 output by the audio component 610 may be used by other components of the user recognition component 295 and/or the wakeword detection component(s) (314/322).

Figure 8:
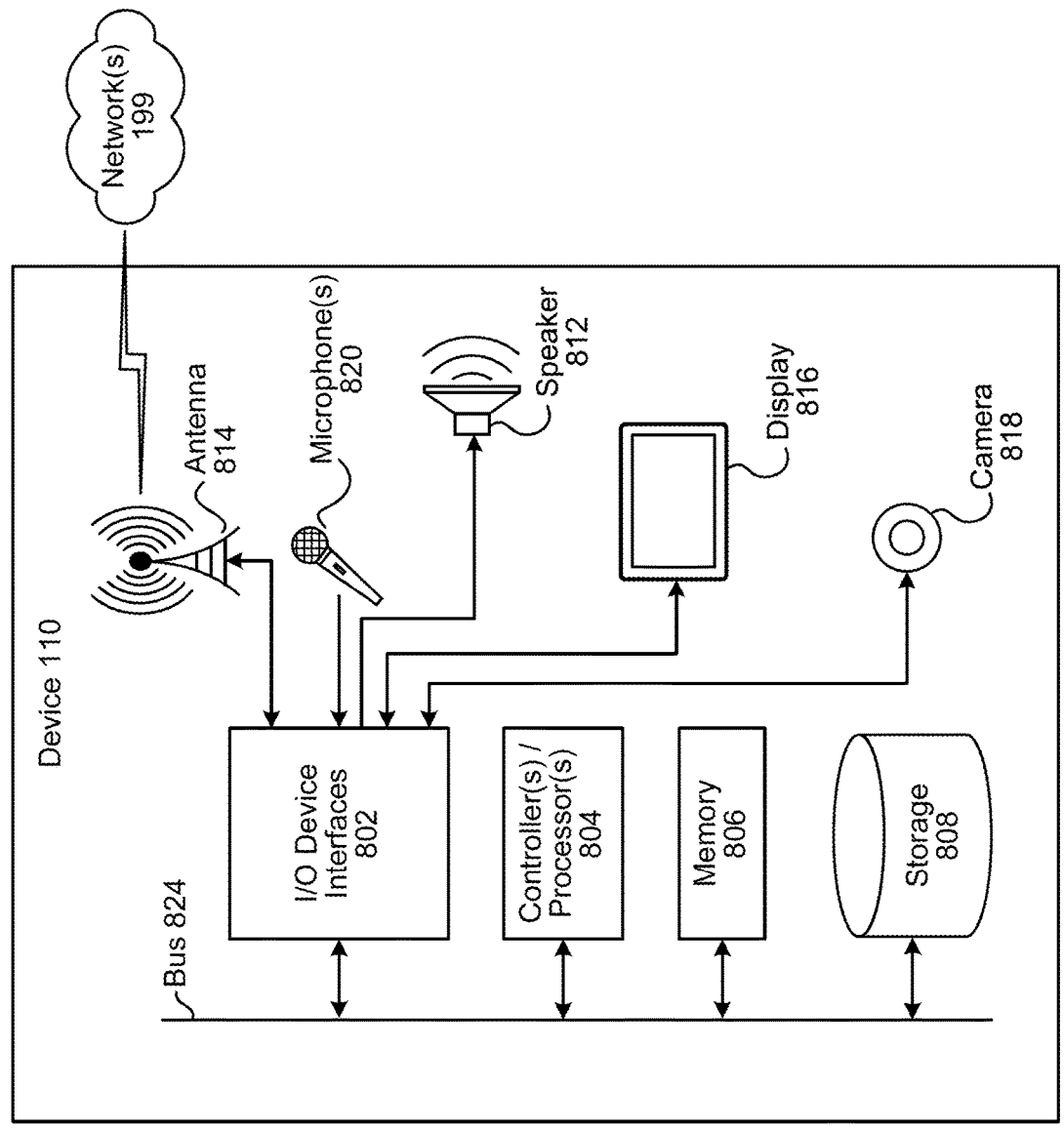
FIG. 8 is a block diagram conceptually illustrating example components of a device according to embodiments of the present disclosure.
Figure 9:
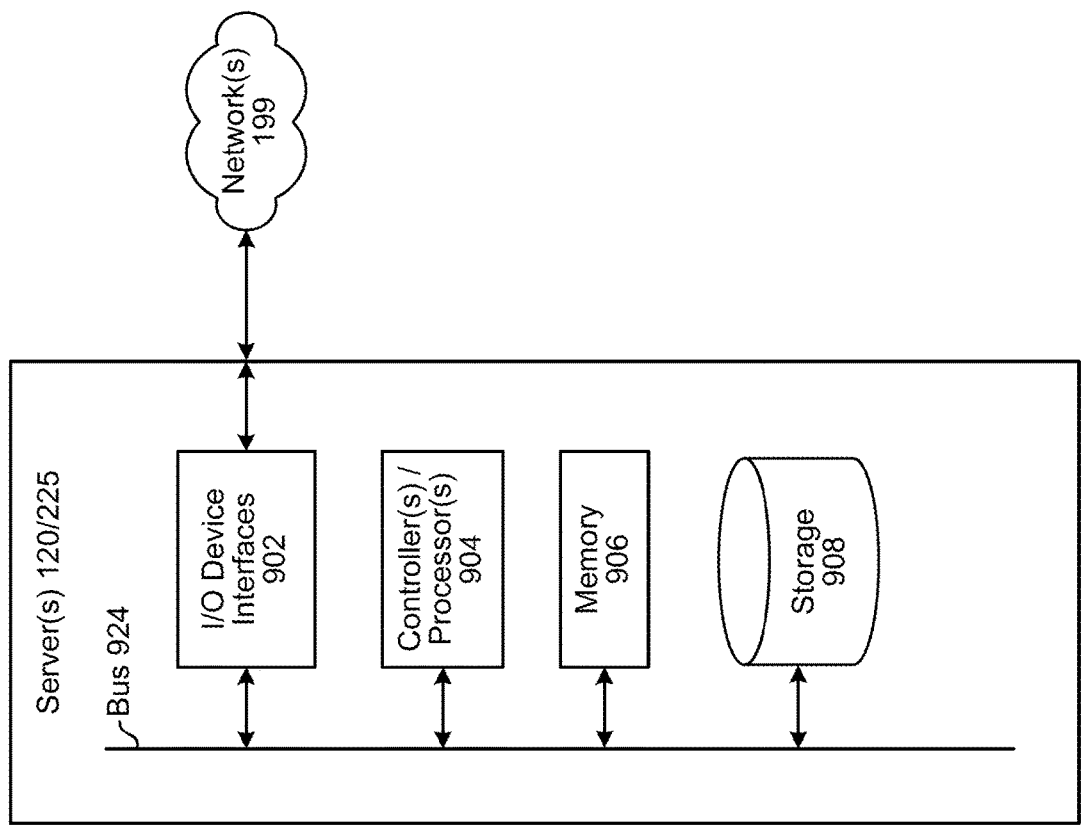
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the server(s) 120, which may assist with ASR processing, NLU processing, etc., and the skill server(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill server(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the server(s) 120, or the skill server(s) 225 may include their own dedicated processors, memory, and/or storage. Alternatively, one or more of the components of the device(s) 110, the server(s) 120, or the skill server(s) 225 may utilize the I/O interfaces (802/902), processor(s) (804/904), memory (806/906), and/or storage (808/908) of the device(s) 110 server(s) 120, or the skill server(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 225, as described herein, are illustrative, and may be located as a stand-alone device or may be included, in whole or in part, as a component of a larger device or system.

Figure 10:
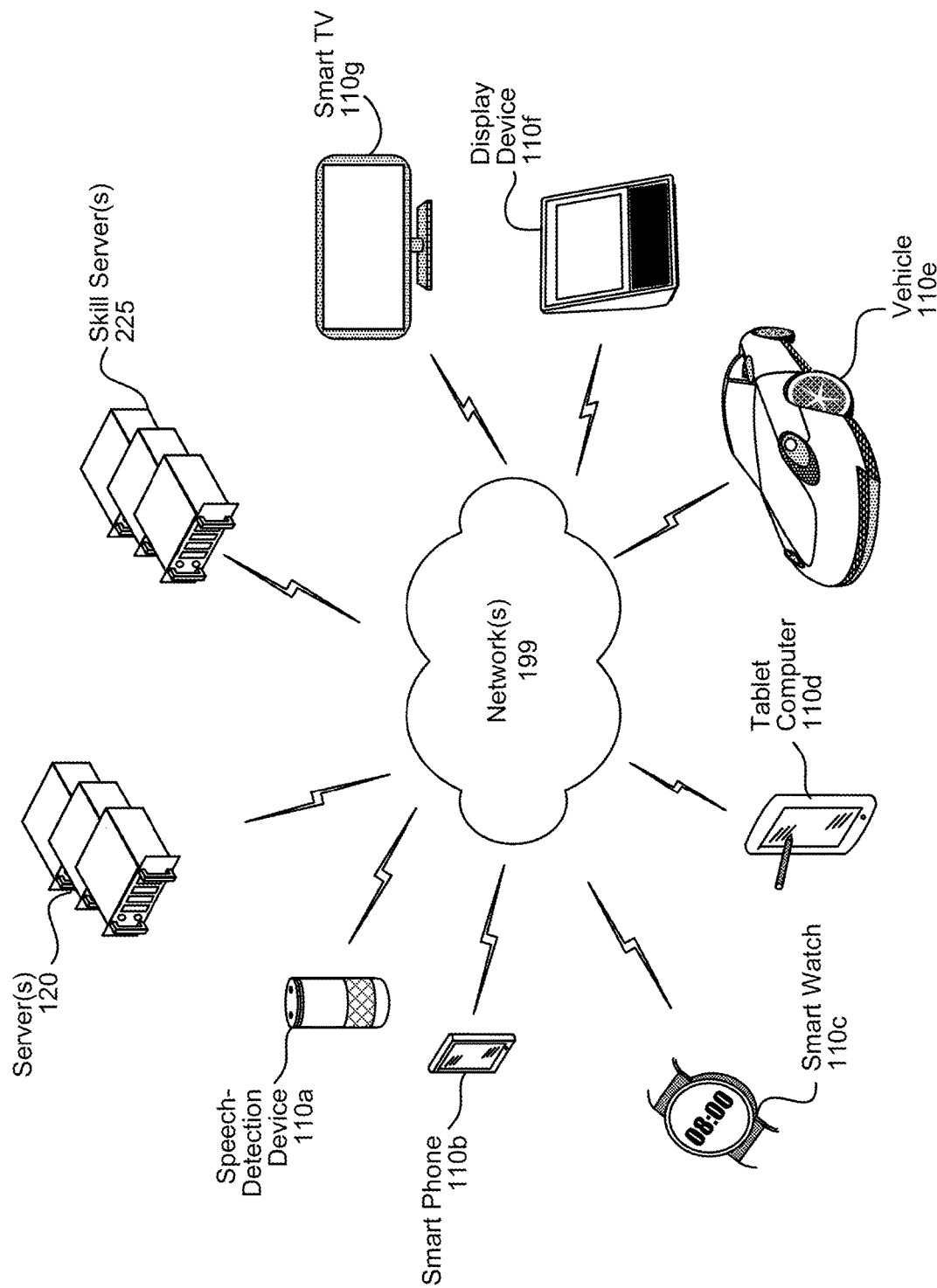
FIG. 10 illustrates an example of a computer network for use with the speech processing system.

As illustrated in FIG. 10, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a Wi-Fi or cellular network connection, or the like. Other devices are included as network-connected support devices, such as the server(s) 120, the skill server(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving first audio data corresponding to an utterance;
    processing the first audio data using:
        a first wakeword detection component configured to detect a representation of at least a first wakeword, the first wakeword detection component being associated with a first speech processing component, and
        a second wakeword detection component configured to detect a representation of at least a second wakeword different from the first wakeword, the second wakeword detection component being associated with a second speech processing component;
    determining the utterance includes the first wakeword; and
    causing the first speech processing component to process further audio data.

2. The computer-implemented method of claim 1, wherein:
    the first speech processing component is associated with a first speech processing system;
    the second speech processing component is associated with a second speech processing system different from the first speech processing system; and
    the method further comprises sending the further audio data to the first speech processing component associated with the first speech processing system.

3. The computer-implemented method of claim 1, wherein:
    the first wakeword detection component is associated with a first companion application; and
    the second wakeword detection component is associated with a second companion application different from the first companion application.

4. The computer-implemented method of claim 1, wherein:
    the first wakeword is associated with a first skill; and
    the second wakeword is associated with a second skill different from the first skill.

5. The computer-implemented method of claim 1, further comprising:
    determining, using the first wakeword detection component, a first confidence value corresponding to the first wakeword; and
    determining, using the second wakeword detection component, a second confidence value corresponding to the second wakeword,
    wherein determining the utterance includes the first wakeword is based at least in part on the first confidence value and the second confidence value.

6. The computer-implemented method of claim 1, wherein operation of the first wakeword detection component occurs at least partially in parallel with operation of the second wakeword detection component.

7. The computer-implemented method of claim 1, wherein the first wakeword detection component comprises at least one trained model trained with respect to a user's voice.

8. A system comprising:
    at least one processor; and
    at least one memory comprising instructions that, when executed by the at least one processor, cause the system to:
        receive first audio data corresponding to an utterance;
        process the first audio data using:
            a first wakeword detection component configured to detect a representation of at least a first wakeword, the first wakeword detection component being associated with a first speech processing component, and
            a second wakeword detection component configured to detect a representation of at least a second wakeword different from the first wakeword, the second wakeword detection component being associated with a second speech processing component;
        determine the utterance includes the first wakeword; and
        cause the first speech processing component to process further audio data.

9. The system of claim 8, wherein:
    the first speech processing component is associated with a first speech processing system;
    the second speech processing component is associated with a second speech processing system different from the first speech processing system; and
    the at least one memory further comprises instructions that, when executed by the at least one processor, further cause the system to send the further audio data to the first speech processing component associated with the first speech processing system.

10. The system of claim 8, wherein:
    the first wakeword detection component is associated with a first companion application; and
    the second wakeword detection component is associated with a second companion application different from the first companion application.

11. The system of claim 8, wherein:
the first wakeword is associated with a first skill; and
the second wakeword is associated with a second skill different from the first skill.

12. The system of claim 8, wherein the at least one memory further comprises instructions that, when executed by the at least one processor, further cause the system to:
determine, using the first wakeword detection component, a first confidence value corresponding to the first wakeword; and
determine, using the second wakeword detection component, a second confidence value corresponding to the second wakeword,
wherein the instructions that cause the system to determine that the utterance includes the first wakeword are based at least in part on the first confidence value and the second confidence value.

13. The system of claim 8, wherein operation of the first wakeword detection component occurs at least partially in parallel with operation of the second wakeword detection component.

14. A computer-implemented method, comprising:
receiving first audio data corresponding to an utterance;
processing the first audio data using a first wakeword detection component to determine that the utterance includes at least a first wakeword;
at least partially in response to determining that the utterance includes the first wakeword, using a second wakeword detection component different from the first wakeword detection component to determine that the utterance includes at least a second wakeword; and
based at least in part on determining that the utterance includes the second wakeword, causing a speech processing component associated with the second wakeword to process further audio data.

15. The computer-implemented method of claim 14, further comprising:
at least partially in response to determining that the utterance includes the first wakeword, using a third wakeword detection component different from the first wakeword detection component and the second wakeword detection component to determine if the utterance includes at least a third wakeword different from the second wakeword.

16. The computer-implemented method of claim 15, wherein operation of the second wakeword detection component occurs at least partially in parallel with operation of the third wakeword detection component.

17. The computer-implemented method of claim 15, wherein:
the second wakeword detection component is associated with a first speech processing system;
the third wakeword detection component is associated with a second speech processing system different from the first speech processing system; and
the method further comprises sending the further audio data to the speech processing component associated with the first speech processing system.

18. The computer-implemented method of claim 15, wherein:
the second wakeword detection component is associated with a first companion application; and
the third wakeword detection component is associated with a second companion application different from the first companion application.

19. The computer-implemented method of claim 15, wherein:
the second wakeword is associated with a first skill; and
the third wakeword is associated with a second skill different from the first skill.

20. The computer-implemented method of claim 14, wherein the first wakeword detection component is associated with a hardware component of a device that detected the utterance.

* * * * *